(12) United States Patent
Nakata

(10) Patent No.: US 9,990,148 B2
(45) Date of Patent: Jun. 5, 2018

(54) STORAGE CONTROL DEVICE AND STORAGE SYSTEM FOR DATA BACKUP

(71) Applicant: FUJITSU LIMITED, Kawasaki-shi, Kanagawa (JP)

(72) Inventor: Yasuyuki Nakata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 330 days.

(21) Appl. No.: 14/862,561

(22) Filed: Sep. 23, 2015

(65) Prior Publication Data

US 2016/0098219 A1 Apr. 7, 2016

(30) Foreign Application Priority Data

Oct. 1, 2014 (JP) ................. 2014-202776

(51) Int. Cl.
*G06F 12/00* (2006.01)
*G06F 3/06* (2006.01)
*G06F 11/20* (2006.01)

(52) U.S. Cl.
CPC ............ *G06F 3/0619* (2013.01); *G06F 3/065* (2013.01); *G06F 3/0656* (2013.01); *G06F 3/0683* (2013.01); *G06F 11/2076* (2013.01)

(58) Field of Classification Search
CPC ............. G06F 11/1451; G06F 11/1456; G06F 11/2076; G06F 3/0619; G06F 3/065; G06F 3/0656; G06F 3/0683
USPC ........................................ 711/162
See application file for complete search history.

(56) References Cited

U.S. PATENT DOCUMENTS

| 2005/0033828 A1 | 2/2005 | Watanabe |
| 2005/0132155 A1 | 6/2005 | Kasako |
| 2006/0047664 A1 | 3/2006 | Suzuki et al. |
| 2007/0201434 A1 | 8/2007 | Nakamura et al. |
| 2008/0162846 A1* | 7/2008 | Kodama ............. G06F 11/1451 711/162 |

FOREIGN PATENT DOCUMENTS

| JP | 2005-55948 | 3/2005 |
| JP | 2005-174196 | 6/2005 |
| JP | 2006-65624 | 3/2006 |
| JP | 2007-219717 | 8/2007 |

* cited by examiner

*Primary Examiner* — Mardochee Chery
(74) *Attorney, Agent, or Firm* — Staas & Halsey LLP

(57) ABSTRACT

A storage control device includes a processor. The processor is configured to receive a read request from a backup device including a memory unit. The processor is configured to transmit, upon receiving a write request from a host device after the read request is received, first data to the backup device as a response to the read request. The write request requests to write the first data. The processor is configured to transmit a writing completion response to the host device upon receiving a writing completion notification from the backup device. The writing completion response notifies of completion of writing the first data. The writing completion notification notifies of completion of writing the first data in the memory unit.

6 Claims, 16 Drawing Sheets

FIG.6A

| FC PACKET IDENTIFIER | SCSI COMMAND IDENTIFIER | CDB ||  |
|---|---|---|---|---|
| | | COMMAND CODE | REQUIRED SIZE | ... |

FIG.6B

DATA AREA

| FC PACKET IDENTIFIER | SCSI COMMAND IDENTIFIER | HEADER INFORMATION ||||  DATA |
|---|---|---|---|---|---|---|
| | | LUN | INITIATION LBA | NUMBER OF BLOCKS | TRANSFER ID | |

FIG.6C

| FC PACKET IDENTIFIER | SCSI COMMAND IDENTIFIER | CDB |||
|---|---|---|---|---|
| | | COMMAND CODE | TRANSFER ID | ... |

FIG.7

| REQUEST TABLE | | | 214 |
|---|---|---|---|
| ID NUMBER | CATEGORY | SIZE RANGE | |
| R1 | 1KB | $S \leq 1KB$ | |
| ... | ... | ... | |
| R9 | 4KB | $1KB < S \leq 4KB$ | |
| ... | ... | ... | |
| R19 | 8KB | $4KB < S \leq 8KB$ | |
| ... | ... | ... | |
| R29 | 16KB | $8KB < S \leq 16KB$ | |
| ... | ... | ... | |
| R39 | 64KB | $16KB < S \leq 64KB$ | |
| ... | ... | ... | |
| R43 | 256KB | $64KB < S \leq 256KB$ | |
| ... | ... | ... | |
| R47 | 512KB | $256KB < S \leq 512KB$ | |
| ... | ... | ... | |
| R51 | 1MB | $512KB < S \leq 1MB$ | |
| ... | ... | ... | |
| R54 | 1MB | $512KB < S \leq 1MB$ | |

FIG.8

| STATISTIC TABLE | | | |
|---|---|---|---|
| CATEGORY | SIZE RANGE | STATISTICAL NUMBER | OPTIMUM SECUREMENT NUMBER |
| 1KB | S ≦ 1KB | 0 | 8 |
| 4KB | 1KB < S ≦ 4KB | 0 | 8 |
| 8KB | 4KB < S ≦ 8KB | 0 | 8 |
| 16KB | 8KB < S ≦ 16KB | 0 | 8 |
| 64KB | 16KB < S ≦ 64KB | 0 | 4 |
| 256KB | 64KB < S ≦ 256KB | 0 | 4 |
| 512KB | 256KB < S ≦ 512KB | 0 | 4 |
| 1MB | 512KB < S ≦ 1MB | 0 | 4 |

| READ REQUEST MANAGEMENT TABLE | | | 114 |
|---|---|---|---|
| ID NUMBER | CATEGORY | SIZE RANGE | RECEPTION TIME |
| R1 | 1KB | $S \leq 1KB$ | T1 |
| ... | ... | ... | ... |
| R9 | 4KB | $1KB < S \leq 4KB$ | T9 |
| ... | ... | ... | ... |
| R19 | 8KB | $4KB < S \leq 8KB$ | T19 |
| ... | ... | ... | ... |
| R29 | 16KB | $8KB < S \leq 16KB$ | T29 |
| ... | ... | ... | ... |
| R39 | 64KB | $16KB < S \leq 64KB$ | T39 |
| ... | ... | ... | ... |
| R43 | 256KB | $64KB < S \leq 256KB$ | T43 |
| ... | ... | ... | ... |
| R47 | 512KB | $256KB < S \leq 512KB$ | T47 |
| ... | ... | ... | ... |
| R51 | 1MB | $512KB < S \leq 1MB$ | T51 |
| ... | ... | ... | ... |
| R54 | 1MB | $512KB < S \leq 1MB$ | T54 |

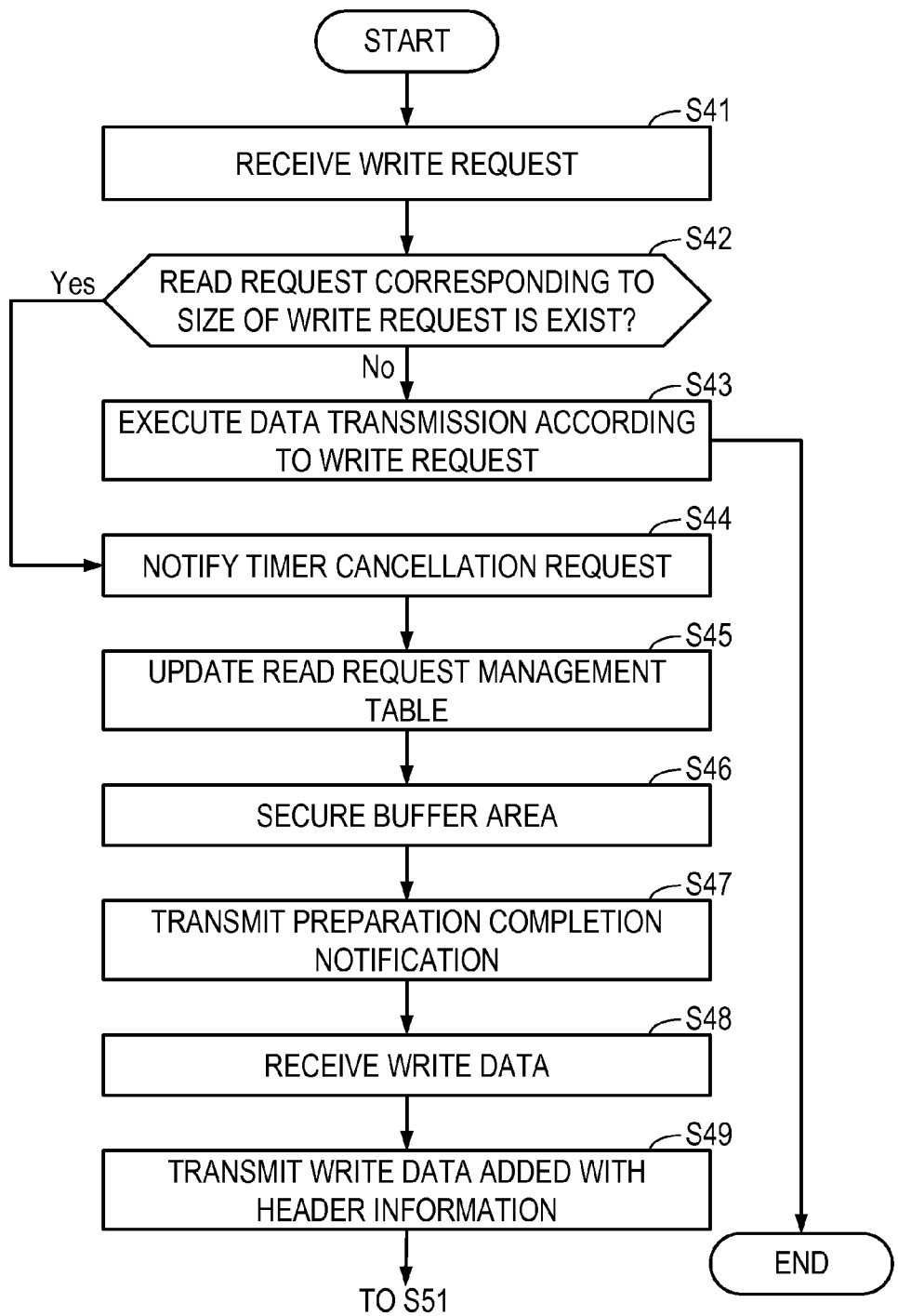

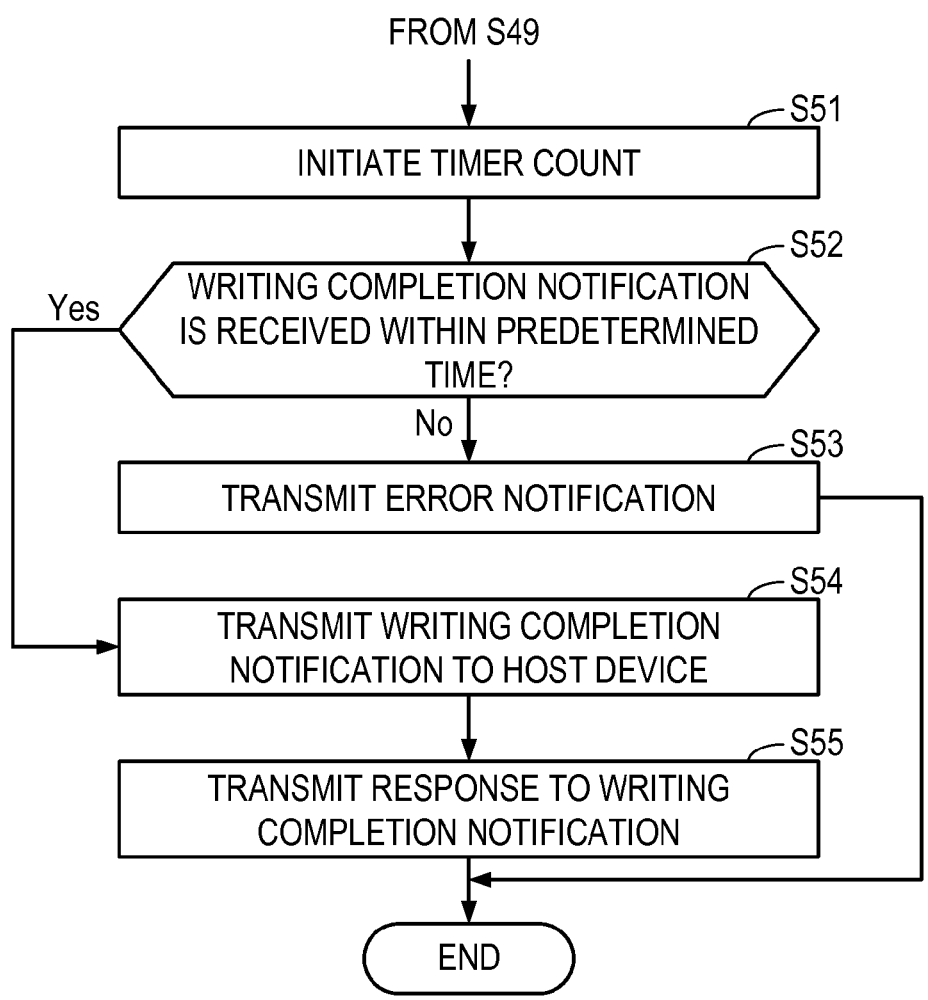

FIG.16A

| STATISTIC TABLE | | | 215a |
|---|---|---|---|
| CATEGORY | SIZE RANGE | STATISTICAL NUMBER | OPTIMUM SECUREMENT NUMBER |
| 1KB | $S \leq 1KB$ | 60 | 8 |
| 4KB | $1KB < S \leq 4KB$ | 40 | 8 |
| 8KB | $4KB < S \leq 8KB$ | 40 | 8 |
| 16KB | $8KB < S \leq 16KB$ | 150 | 8 |
| 64KB | $16KB < S \leq 64KB$ | 80 | 4 |
| 256KB | $64KB < S \leq 256KB$ | 0 | 4 |
| 512KB | $256KB < S \leq 512KB$ | 40 | 4 |
| 1MB | $512KB < S \leq 1MB$ | 10 | 4 |

FIG.16B

| STATISTIC TABLE | | | 215b |
|---|---|---|---|
| CATEGORY | SIZE RANGE | STATISTICAL NUMBER | OPTIMUM SECUREMENT NUMBER |
| 1KB | $S \leq 1KB$ | 0 | 7 |
| 4KB | $1KB < S \leq 4KB$ | 0 | 5 |
| 8KB | $4KB < S \leq 8KB$ | 0 | 5 |
| 16KB | $8KB < S \leq 16KB$ | 0 | 17 |
| 64KB | $16KB < S \leq 64KB$ | 0 | 9 |
| 256KB | $64KB < S \leq 256KB$ | 0 | 1 |
| 512KB | $256KB < S \leq 512KB$ | 0 | 4 |
| 1MB | $512KB < S \leq 1MB$ | 0 | 1 |

STORAGE CONTROL DEVICE AND STORAGE SYSTEM FOR DATA BACKUP

CROSS-REFERENCE TO RELATED APPLICATION

This application is based upon and claims the benefit of priority from the prior Japanese Patent Application No. 2014-202776 filed on Oct. 1, 2014, the entire contents of which are incorporated herein by reference.

FIELD

The embodiments discussed herein are related to a storage control device and a storage system.

BACKGROUND

As an example of a backup method of data, there is a method of duplicating data in memory devices controlled by storage control devices. In the method, when a first storage control device receives a request to write the data from a host device, the first storage control device writes the data in its own memory and also transmits the data to a second storage control device so that the data is to be written in a memory controlled by the second storage control device thereby duplicating the data. With this backup method, for example, it is possible to reduce the possibility of data loss due to, for example, an occurrence of a disaster by providing the respective storage control devices at physically separate locations from each other. In the backup method above, an operation mode, in which the first storage control device that has received the request of data writing from the host device transmits a writing completion response to the host device after completion of data duplication, is referred to as, for example, a "synchronous mode".

As an example of a data backup technology, there has been suggested a technology in which write data that has been received by a first memory subsystem from a host terminal is received by a second memory subsystem. In this technology, the first memory subsystem generates a data set which includes the write data and an update number indicating an update order of a memory device included in the first memory subsystem. The first memory subsystem transmits, to the second memory subsystem, write data corresponding to an update number designated by a read command received from the second memory subsystem.

As another example, there has been suggested a technology in which a first memory system transmits, to a third memory system, write data and address information indicating a storage location where the write data is written, and a second memory system receives the write data from the third memory system according to the address information.

As an example of a data write request sequence, there is known a sequence in which, when a host computer transmits a write request, a storage system returns a completion notification of data receiving preparation, and the host computer that has received the completion notification transmits write data.

Related techniques are disclosed in, for example, Japanese Laid-Open Patent Publication No. 2006-65624, Japanese Laid-Open Patent Publication No. 2005-55948, and Japanese Laid-Open Patent Publication No. 2007-219717.

In the backup process in the synchronous mode, when a first storage control device that has received a write request of data from a host device transmits write data to a second storage control device, the write request sequence above may be used. In this case, the first storage control device transmits a write request to the second storage control device, receives the completion notification of receiving preparation from the second storage control device, and transmits the write data to the second storage control device.

In this case, the first storage control device needs to perform a communication in one round trip with the second storage control device before transmitting the write data, and there is a problem in that a time for responding to the host device is prolonged to that extent. In particular, as the physical distance between the storage control devices becomes longer, the time required for the communication between the storage control devices is prolonged. As a result, the time for responding to the host device is further prolonged.

Besides the backup process in a synchronous mode, the write request sequence above may be used in a write request in a case where the first storage control device that has received write data from the host device transmits the write data to the second storage control device so that the write data is written in a memory device of the second storage control device. A similar problem may occur in this case as well.

SUMMARY

According to an aspect of the present invention, provided is a storage control device including a processor. The processor is configured to receive a read request from a backup device including a memory unit. The processor is configured to transmit, upon receiving a write request from a host device after the read request is received, first data to the backup device as a response to the read request. The write request requests to write the first data. The processor is configured to transmit a writing completion response to the host device upon receiving a writing completion notification from the backup device. The writing completion response notifies of completion of writing the first data. The writing completion notification notifies of completion of writing the first data in the memory unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 6A to 6C are diagrams illustrating information used in a communication between CMs;

FIG. 7 is a diagram illustrating an example of a request table;

FIG. 8 is a diagram illustrating an example of a statistic table;

FIG. 9 is a diagram illustrating an example of a read request management table;

FIG. 14 is a flowchart illustrating an example of a process of receiving a write request;

FIG. 15 is a flowchart illustrating an example of a process of receiving the write request; and FIGS. 16A and 16B are diagrams illustrating a specific example of a process of optimizing buffer area securement.

DESCRIPTION OF EMBODIMENTS

Hereinafter, embodiments will be described with reference to drawings.

First Embodiment

Figure 1:
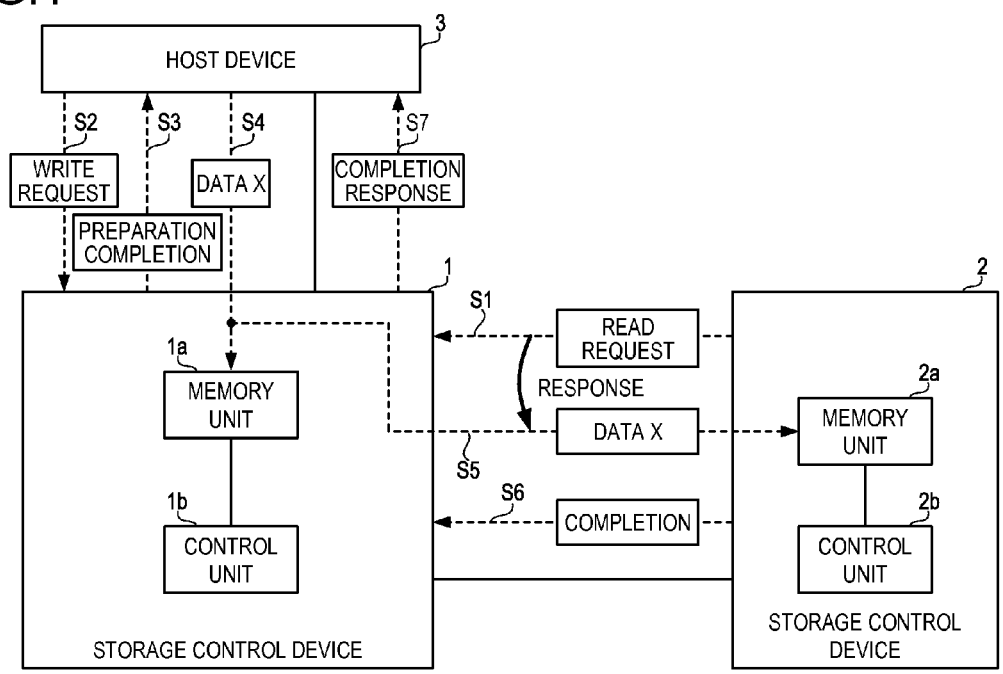
FIG. 1 is a diagram illustrating a storage system according to a first embodiment.

FIG. 1 is a diagram illustrating a storage system according to a first embodiment. The storage system includes storage control devices 1 and 2. The storage control devices 1 and 2 are connected via, for example, a network. The storage control device 1 is connected to a host device 3 that requests the storage control device 1 to write data. The storage control device 1 and the host device 3 are connected via, for example, a network.

The storage control device 1 includes a memory unit 1a and a control unit 1b. The storage control device 2 includes a memory unit 2a and a control unit 2b. The memory units 1a and 2a may be a volatile memory device such as a random access memory (RAM), or a nonvolatile memory device such as a hard disk drive (HDD) or a solid state drive (SSD). The control units 1b and 2b may include, for example, a central processing unit (CPU), a digital signal processor (DSP), an application specific integrated circuit (ASIC), and a field programmable gate array (FPGA). The control units 1b and 2b may be a multiprocessor including a plurality of processing elements.

In the storage system, the storage control device 1 that has received write data from the host device 3 stores the write data in the memory unit 1a and causes the storage control device 2 to store therein the write data so as to back up the write data.

In the storage control device 1, the memory unit 1a stores therein the write data requested to be written from the host device 3. The memory unit 1a is a memory device to be accessed by the host device 3. The memory unit 1a may be used as a cache area when the host device accesses a memory device other than the memory unit 1a.

The control unit 1b receives a read request from the storage control device 2. The control unit 1b receives a write request of write data from the host device 3 after receiving the read request. The control unit 1b writes the write data in the memory unit 1a, and also transmits the write data to the storage control device 2, as a response to the read request. Upon receiving a writing completion notification that notifies completion of writing the write data in the memory unit 2a from the storage control device 2, the control unit 1b transmits a writing completion response that notifies completion of writing the write data to the host device 3.

In the storage control device 2, the memory unit 2a stores therein the write data transmitted from the storage control device 1. The control unit 2b transmits the read request to the storage control device 1. The read request does not specify particular data. After transmitting the read request, the control unit 2b receives the write data as a response to the read request from the storage control device 1 when the storage control device 1 receives the write request of the write data from the host device 3. The control unit 2b writes the write data in the memory unit 2a, and transmits the writing completion notification to the storage control device 1.

According to such a storage system, upon receiving the write request from the host device 3, the storage control device 1 transmits the write data received from the host device 3 to the storage control device 2, as a response to the read request which has already been received. Accordingly, after receiving the write request from the host device 3, the storage control device 1 may transmit the write data to the storage control device 2 without any particular communication with the storage control device 2. Accordingly, a time required, after the storage control device 1 receives the write request from the host device 3, until the write data is written in each of the memory units 1a and 2a and the storage control device 1 transmits the writing completion notification to the host device 3 may be reduced.

Hereinafter, a specific processing example will be described with reference to FIG. 1. Before the storage control device 1 receives a write request from the host device 3, the control unit 2b transmits a read request to the storage control device 1 (S1). The control unit 1b receives the read request from the storage control device 2.

After receiving the read request, the control unit 1b receives the write request from the host device 3 (S2). The control unit 1b notifies the host device 3 that the preparation for receiving the write data has been completed (S3). As for the preparation for receiving the write data, a processing of securing a buffer area for temporarily storing the received write data within the storage control device 1 may be exemplified. Upon receiving the notification that the preparation has been completed, the host device 3 transmits data X to the storage control device 1 (S4). Upon receiving the data X, the control unit 1b writes the data X in the memory unit 1a, and also transmits the data X to the storage control device 2, as a response to the read request (S5).

Upon receiving the data X, the control unit 2b stores the data X in the memory unit 2a. The control unit 2b transmits a writing completion notification that notifies completion of writing the write data in the memory unit 2a, to the storage control device 1 (S6). Upon receiving the writing completion notification, the control unit 1b transmits a writing completion response that notifies completion of writing the write data, to the host device 3 (S7).

As for a sequence of requesting a counterpart device to write data, as exemplified in S2 to S4, there is a sequence of transmitting a write request to the counterpart device, and transmitting write data to the counterpart device upon receiving the notification that the preparation for writing has been completed from the counterpart device. When the sequence described above is performed when the storage control device 1 transmits the write data to the storage control device 2, the storage control device 1 needs to perform communications such as transmission of the write request, and reception of a preparation completion notification before transmitting the write data.

In contrast to this, according to the first embodiment, before the storage control device 1 receives the write request from the host device 3, the storage control device 2 transmits the read request to the storage control device 1 in advance. Then, upon receiving the write request from the host device 3, the storage control device 1 transmits the write data to the storage control device 2 as a response to the read request which has already been received. Accordingly, the process is completed without performing communications such as transmission of the write request, and reception of the preparation completion notification as described above until the storage control device 1 transmits the write data to the storage control device 2 after receiving the write request from the host device 3. Thus, a time required until the storage control device 1 transmits the writing completion response to the host device 3 after receiving the write request from the host device 3 may be reduced. Accordingly, according to the first embodiment, a time required until transmission of the writing completion response to the host device 3 after the request of writing in the storage control device 1 may be reduced.

The data X received by the storage control device 1 from the host device 3 may be written only in the memory unit 2a of the storage control device 2 without being written in the memory unit 1a. As for such a case, for example, a case where the request of writing data in the memory unit 2a of the storage control device 2 is received from the host device 3 by the storage control device 1 may be considered. In this case where the data X is written only in the memory unit 2a, a similar processing as described above may be employed. That is, when receiving the read request from the control unit 2b of the storage control device 2 in advance, and then receiving the write request of the data X from the host device 3, the control unit 1b of the storage control device 1 transmits the data X as a response to the read request, to the storage control device 2. Then, upon receiving a writing completion notification that notifies completion of writing the data X in the memory unit 2a from the control unit 2b, the control unit 1b transmits a writing completion response that notifies completion of writing the data X to the host device 3. Accordingly, a time required until transmission of the writing completion response to the host device 3 after the request of writing data in the storage control device 2 may be reduced.

Second Embodiment

Figure 2:
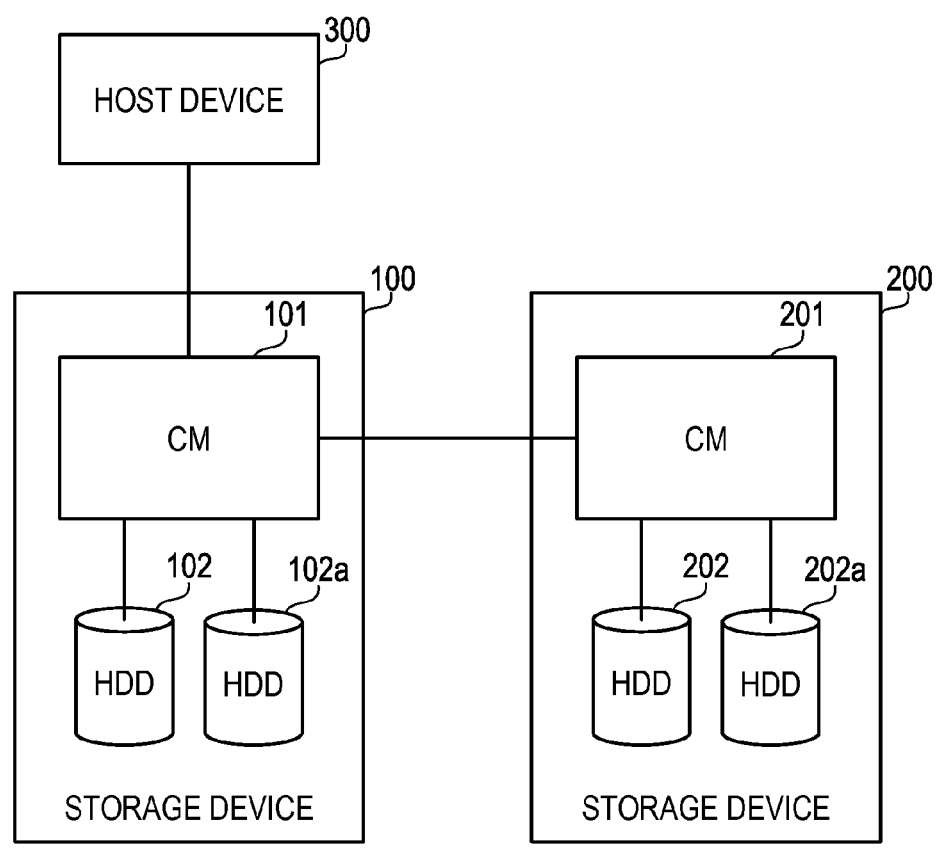
FIG. 2 is a diagram illustrating a storage system according to a second embodiment.

FIG. 2 is a diagram illustrating a storage system according to a second embodiment. The storage system according to the second embodiment includes storage devices 100 and 200. The storage device 100 serves as a primary storage device of the storage system. The storage device 200 serves as a secondary storage device of the storage system. The storage system is capable of backing up data stored in the storage device 100 to the storage device 200 placed in a remote location in order to prepare against, for example, an unexpected disaster.

The storage device 100 includes a controller module (CM) 101 and HDDs 102 and 102a. The storage device 200 includes a CM 201 and HDDs 202 and 202a. The CM 101 and the CM 201 are connected to each other via, for example, a storage area network (SAN) using a fibre channel (FC) or an internet small computer system interface (iSCSI), or a wide area network (WAN) using the iSCSI.

Also, the CMs 101 and 201 are examples of the storage control devices 1 and 2 according to the first embodiment, respectively. The number of HDDs to be connected to each of the CMs 101 and 201 is not limited to two. A disk array device mounted with a plurality of HDDs may be connected to each of the CMs 101 and 201.

A host device 300 is connected to the CM 101. The CM 101 and the host device 300 are connected to each other via, for example, a SAN using an FC. The host device 300 requests the CM 101 to access the HDDs 102 and 102a. The CM 101 controls the accesses to the HDDs 102 and 102a according to the request from the host device 300 while using a RAM of the CM 101 as a cache area.

The CM 101 also transmits and backs up the data stored in the cache area to the CM 201. Specifically, upon receiving a write request of writing write data from the host device 300, the CM 101 writes the write data in the cache area and also transmits the write data to the CM 201. Upon receiving a writing completion notification notifying that the write data has been written in a cache area in an RAM of the CM 201 from the CM 201, the CM 101 notifies the host device 300 that the writing has been completed.

The CM 201 backs up the data transmitted from the CM 101 to the cache area in the RAM of the CM 201. The CM 201 may store the data stored in the cache area in the HDDs 202 and 202a through a similar cache control as in the CM 101.

Figure 3:
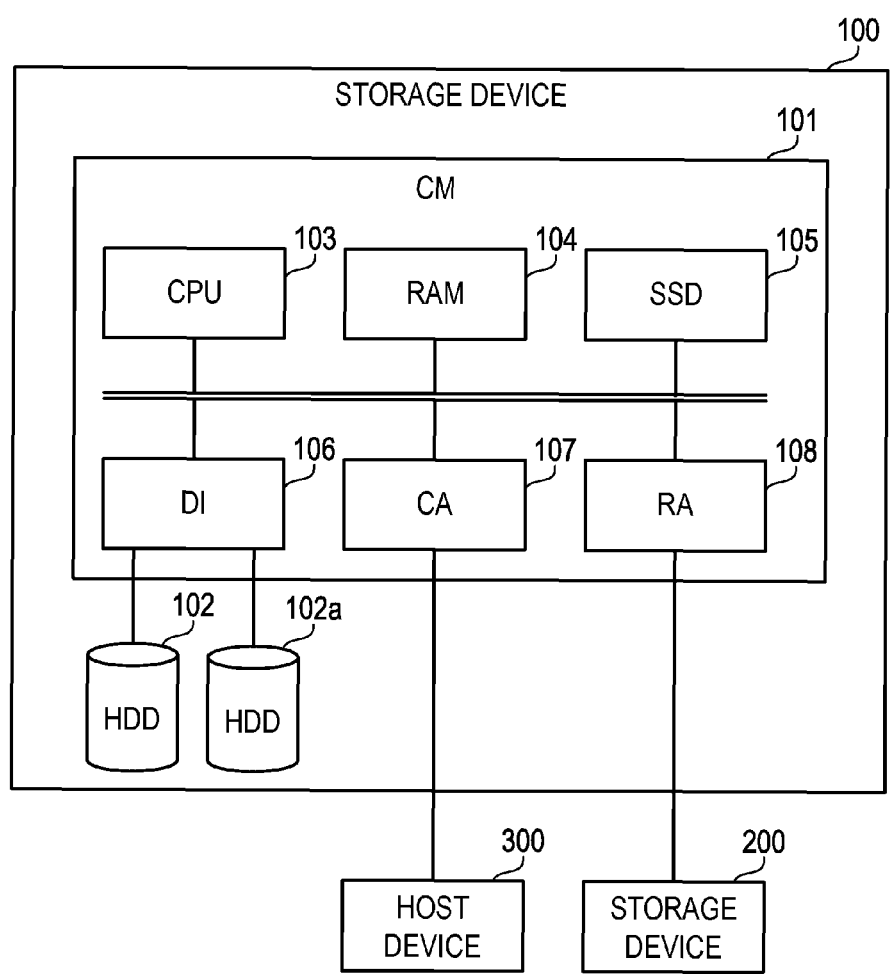
FIG. 3 is a diagram illustrating an exemplary hardware configuration of a CM of a storage device.

FIG. 3 is a diagram illustrating an exemplary hardware configuration of a CM of a storage device. The CM 101 includes a CPU 103, a RAM 104, an SSD 105, a drive interface (DI) 106, a channel adapter (CA) 107, and a remote adapter (RA) 108. Each unit 1a connected to a bus.

The CPU 103 controls the information processing of the CM 101. The CPU 103 may be a multiprocessor including a plurality of processing elements.

The RAM 104 is a main memory device of the CM 101. The RAM 104 temporarily stores at least a part of a program of an operating system (OS) and an application program to be executed by the CPU 103. The RAM 104 also stores various data used for processing by the CPU 103.

The SSD 105 is an auxiliary memory device of the CM 101. The SSD 105 is a nonvolatile semiconductor memory. The program of the OS, the application program, and various data is stored in the SSD 105. The CM 101 may include an HDD, instead of the SSD 105, as an auxiliary memory device.

The DI 106 is an interface for communicating with the HDDs 102 and 102a. The CA 107 is an interface for communicating with the host device 300. The RA 108 is an interface for communicating with the storage device 200.

The CM 201 may be realized by similar hardware as the CM 101.

Respective memory areas of the HDDs 102 and 102a are managed as, for example, a redundant array of inexpensive disks (RAID). In the memory area, one or more logical volumes are set, and a logical unit number (LUN) is allocated to each of the logical volumes. The host device 300 performs an access process by designating a LUN and a logical block address (LBA) of the corresponding logical volume.

When backing up, to the CM 201, write data received from the host device 300 to be written in a logical volume, the CM 101 designates the LUN and the LBA which are designated for the write data, as a writing destination. Accordingly, the logical volume is duplicated in the CM 101 and the CM 201.

Figure 4:
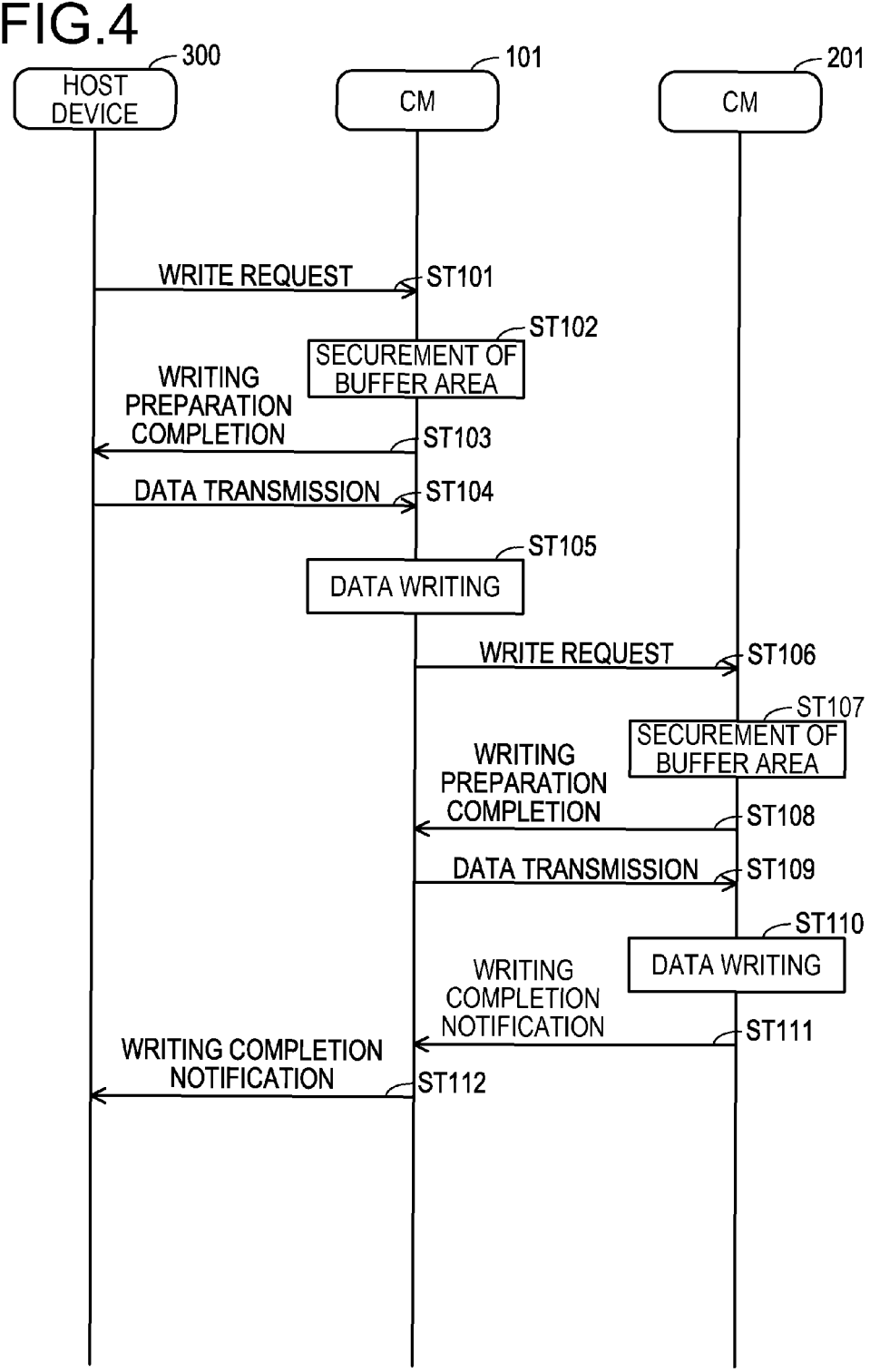
FIG. 4 is a sequence diagram illustrating a comparative example of a backup process.

Hereinafter, a comparative example of a backup process for backing up data stored in a cache area of the CM 101 to the CM 201 will be presented, and problems in this comparative example will be described. FIG. 4 is a sequence diagram illustrating a comparative example of the backup process. Hereinafter, the process illustrated in FIG. 4 will be described.

(ST101) The host device 300 transmits a write request to the CM 101.

(ST102) The CM 101 secures, in the RAM 104, a buffer area for temporarily storing write data.

(ST103) The CM 101 notifies the host device 300 that the writing preparation has been completed.

(ST104) The host device 300 transmits the write data to the CM 101.

(ST105) The CM 101 receives the write data and writes the write data in the buffer area secured in the RAM 104. The CM 101 also writes the write data stored in the buffer area in a memory area designated by the write request, in a cache area of the RAM 104. At a point of time the writing of the write data in the buffer area is completed, ST106 may be executed.

(ST106) The CM 101 transmits the write request to the CM 201.

(ST107) The CM 201 secures a buffer area for temporarily storing write data in a RAM of the CM 201.

(ST108) The CM 201 notifies the CM 101 that the writing preparation has been completed.

(ST109) The CM 101 transmits the write data to the CM 201.

(ST110) The CM 201 receives the write data and writes the write data in the buffer area secured in the RAM of the CM 201. The CM 201 also writes the write data stored in the buffer area in a memory area designated by the write request, in a cache area of the RAM.

(ST111) The CM 201 notifies the CM 101 that the writing of the write data in the RAM of the CM 201 has been completed.

(ST112) The CM 101 notifies the host device 300 of the writing completion.

In the exemplary process described above, before the write data is transmitted from the CM 101 to the CM 201 in ST109, communications are performed between the CM 101 and the CM 201 as described in ST106 and ST108. Thus, there is a problem in that an unnecessarily long time is required until the host device 300 is notified of the writing completion. Also, as the distance between the CM 101 and the CM 201 becomes longer, the time required until the host device 300 is notified of the writing completion may be prolonged.

According to the second embodiment, before the CM 101 receives the write request from the host device 300, the CM 201 transmits the read request to the CM 101 in advance, and receives the write data, as a response to the read request. Accordingly, the process is ended without performing the communications in ST106 and ST108. Thus, the time required until the host device 300 is notified of the writing completion may be reduced.

Figure 5:
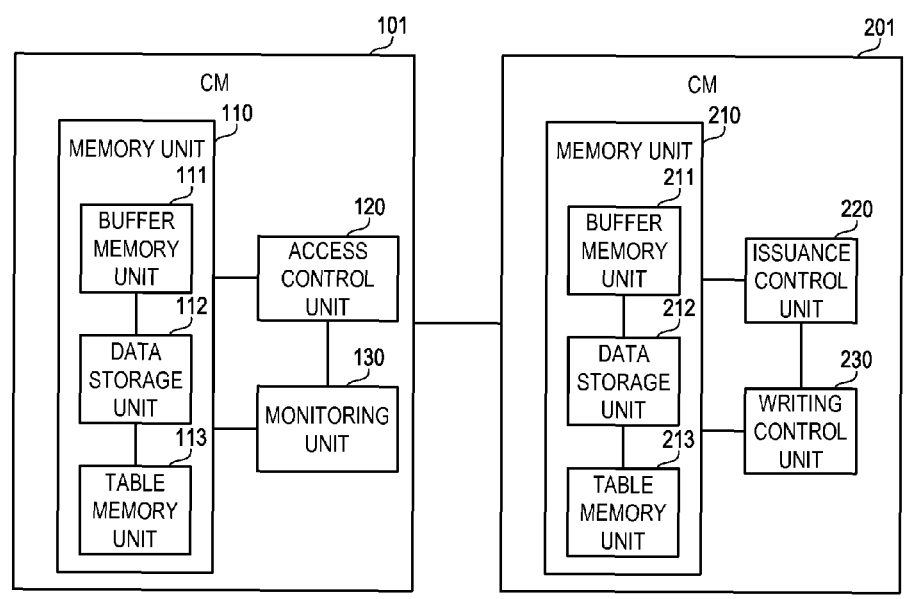
FIG. 5 is a diagram illustrating an exemplary functional configuration of a CM of each storage device.

FIG. 5 is a diagram illustrating an exemplary functional configuration of a CM of each storage device. The CM 101 includes a memory unit 110, an access control unit 120, and a monitoring unit 130. The memory unit 110 includes a buffer memory unit 111, a data storage unit 112, and a table memory unit 113. The buffer memory unit 111, the data storage unit 112, and the table memory unit 113 are implemented as the memory area secured in the RAM 104.

The buffer memory unit 111 temporarily stores the write data. The buffer memory unit 111 is implemented as a set of buffer areas secured by the access control unit 120. The data storage unit 112 is used as a cache area at the access to a logical volume from the host device 300.

The table memory unit 113 stores a read request management table and a write request management table. In the read request management table, information on a read request transmitted from the CM 201 is registered. In the write request management table, information indicating a write request received from the host device 300 is registered, for which the write data is transmitted as a response to the read request from the CM 201.

The access control unit 120 and the monitoring unit 130 are implemented as, for example, the CPU 103 included in the CM 101.

The access control unit 120 controls an access from the host device 300. For example, upon receiving a read request from the host device 300, the access control unit 120 reads data requested to be read from the data storage unit 112 and transmits the data to the host device 300 when the data is stored in the data storage unit 112. When the data requested to be read is not stored in the data storage unit 112, the access control unit 120 reads the data from the HDDs 102 and 102a, stores the data in the data storage unit 112, and then transmits the data to the host device 300.

Upon receiving a write request from the host device 300, the access control unit 120 temporarily stores write data received from the host device 300 in the buffer area secured in the buffer memory unit 111. The access control unit 120 reads the write data from the buffer area, and stores the write data in the memory area of the data storage unit 112 on the basis of the LUN and the LBA designated by the host device 300. The access control unit 120 also stores the write data stored in the data storage unit 112 in a corresponding memory area of the HDDs 102 and 102a at the timing asynchronous with the reception of the write request from the host device 300.

Upon receiving the write request from the host device 300, the access control unit 120 performs a control such that the write data is not only stored in the data storage unit 112, but also backed up to the cache area of the CM 201 (a data storage unit 212 to be described below). In order to implement the backup process within a short time, the access control unit 120 receives the read request from the CM 201 before receiving the write request from the host device 300. Upon receiving the write request from the host device 300, the access control unit 120 transmits the write data to the CM 201, as a response to the read request which has already been received. Upon receiving the notification that the writing of the write data in the cache area has been completed from the CM 201, the access control unit 120 transmits a notification of writing completion to the host device 300.

Upon receiving the read request from the CM 201, the monitoring unit 130 monitors whether a response to the read request may be made within a predetermined time from the reception time.

The CM 201 includes a memory unit 210, an issuance control unit 220, and a writing control unit 230. The memory unit 210 includes a buffer memory unit 211, the data storage unit 212, and a table memory unit 213. The buffer memory unit 211, the data storage unit 212, and the table memory unit 213 are implemented as a memory area secured in the RAM included in the CM 201.

The buffer memory unit 211 temporarily stores the write data received from the CM 101. The buffer memory unit 211 is implemented as a set of buffer areas secured by the issuance control unit 220. Thus, the capacity of the buffer memory unit 211 varies according to the number of secured buffer areas or the sizes of the respective buffer areas. The data storage unit 212 stores backup data corresponding to the data stored in the data storage unit 112 of the CM 101.

The table memory unit 213 stores a request table and a statistic table. In the request table, information on the read request is registered. In the statistic table, information indicating, for example, the number of responses to the read request, which are received by the writing control unit 230 within a predetermined time, is registered.

The issuance control unit 220 and the writing control unit 230 are implemented as, for example, a CPU included in the CM 201. The issuance control unit 220 and the writing control unit 230 execute processing for backing up data stored in the data storage unit 112 of the CM 101.

The issuance control unit 220 secures, in the buffer memory unit 211, a buffer area which is configured to store the write data transmitted from the storage device 100 as a response to the read request. A plurality of read requests are transmitted from the CM 201 to the CM 101, and the issuance control unit 220 secures buffer areas corresponding to the respective transmitted read requests. The plurality of buffer areas include areas having different sizes. The issuance control unit 220 adjusts the number of the read requests to be transmitted to the CM 101, and the size of the buffer area to be allocated to each read request.

The writing control unit 230 transmits the read request to the storage device 100. The read request does not designate specific data. The read request includes designation of a data size. That is, the writing control unit 230 transmits the read request to the storage device 100 in order to request data having a size not larger than the size of a buffer area of the buffer memory unit 211 which is secured by the issuance control unit 220.

Upon receiving the write data, which is requested to be written from the host device 300, from the CM 101 as a response to the read request, the writing control unit 230 temporarily stores the write data in a corresponding buffer area and writes the write data in the data storage unit 212. Then, the writing control unit 230 transmits a notification of writing completion of the write data to the CM 101.

Hereinafter, simple descriptions will be made on a process in which the writing control unit 230 transmits the read request to the storage device 100, and then receives and stores the write data in the buffer memory unit 211.

The issuance control unit 220 secures a plurality of buffer areas in the buffer memory unit 211. The plurality of buffer areas include areas having different sizes. The writing control unit 230 transmits, to the CM 101, the read requests corresponding to the respective buffer areas secured by the issuance control unit 220. Upon receiving the write request from the host device 300, the access control unit 120 selects a read request corresponding to a data size designated by the write request among a plurality of read requests received from the CM 201. The access control unit 120 transmits, to the CM 201, the write data received from the host device 300, as a response to the selected read request. The writing control unit 230 temporarily stores the write data in the buffer area allocated to the read request selected by the access control unit 120, and then stores the data in the data storage unit 212.

FIGS. 6A to 6C are diagrams illustrating information used in a communication between CMs. Here, descriptions will be made on an example of a case where the CM 101 and the CM 201 are connected to each other via a SAN using an FC.

FIG. 6A is a diagram illustrating a packet of a read request generated by the writing control unit 230. For example, the read request is a read request in ST122 of FIG. 10 as described below. The packet of the read request includes items such as an "FC packet identifier", a "small computer system interface (SCSI) command identifier", and a "command descriptor block (CDB)". In the item of "FC packet identifier", information for identifying an FC packet is registered. In the item of "SCSI command identifier", as for information for identifying an SCSI command, information indicating transmission of a CDB is registered. The item of "CDB" includes items such as a "command code" and a "required size". In the item of "command code", a code name indicating a read request which is made before the storage device 100 receives a write request from the host device 300 is registered. In the item of "required size", information indicating a size of a buffer area secured in the buffer memory unit 211 for the read request is registered.

FIG. 6B is a diagram illustrating a response packet to be transmitted to the storage device 200 as a response to the read request. The response packet includes an "FC packet identifier", an "SCSI command identifier", and a data area.

In the item of "FC packet identifier", information for identifying an FC packet is registered. In the item of "SCSI command identifier", as for information for identifying an SCSI command, information indicating that the data requested to be read is included is registered.

In the data area, header information is added to actual data to be transmitted to the data storage unit 212. The header information includes items such as an "LUN", an "initiation LBA", a "number of blocks", and a "transfer (identifier) ID". The item of "LUN", the item of "initiation LBA", and the item of "number of blocks" indicate a writing destination logical address in the data storage unit 212. That is, in the item of "LUN", an LUN designated as a writing destination is registered. In the item of "initiation LBA", an LBA indicating a writing initiation location in the designated LUN is registered. In the item of "number of blocks", the number of logical blocks included in the writing destination area is registered. The number of logical blocks indicates a data size stored in the data storage unit 212. In the item of "transfer ID", an identifier for a transmission processing of the response packet, which is arbitrarily allocated by the CM 101, is registered.

FIG. 6C is a diagram illustrating a packet of a writing completion notification generated by the writing control unit 230. For example, the writing completion notification is a writing completion notification in ST131 of FIG. 10 as described below. The writing completion notification includes items such as an "FC packet identifier", an "SCSI command identifier", and a "CDB". In the item of "FC packet identifier", information for identifying an FC packet is registered. In the item of "SCSI command identifier", as for information for identifying an SCSI command, information indicating transmission of a CDB is registered. The item of "CDB" includes items such as a "command code" and a "transfer ID". In the item of "command code", a code name indicating that writing of the data included in the received response packet of FIG. 6B in the data storage unit 212 is completed. In the item of "transfer ID", the transfer ID registered in the header information of the corresponding response packet is registered.

FIG. 7 is a diagram illustrating an example of a request table. A request table 214 is stored in the table memory unit 213. The request table 214 includes items of "ID number", "category", and "size range".

In the item of "ID number", an identifier for identifying a read request transmitted to the CM 101 by the writing control unit 230 is registered. As for this identifier, the SCSI command identifier of FIG. 6A is registered. In the item of "category", information indicating a category relating to a data size to be transmitted as a response to the read request is registered. This information indicates an upper limit of a data size of data transmittable as a response to the read request, that is, a size of a buffer area allocated to the read request. In the item of "size range", information indicating a range of a data size corresponding to the category is registered. "S" noted in the item of "size range" indicates a size. Also in other tables, "S" in the item of "size range" indicates a size.

For example, in the request table 214, information including an ID number "R9", a category "4 KB", and a size range "1 KB<S≤4 KB" is registered. This indicates that data with an upper limit of 4 KB may be received from the CM 101 as a response to the read request of the ID number "R9". Also, it indicates that the size of the data to be transmitted as a response to the read request may be greater than 1 KB in order to suppress a large wasted space in the buffer area.

FIG. 8 is a diagram illustrating an example of a statistic table. A statistic table 215 is stored in the table memory unit 213. The statistic table 215 includes items of "category", "size range", "number of statistics", and "optimum securement number."

In the item of "category", information indicating a category is registered. In the item of "size range", information indicating a range of a data size corresponding to the category is registered. In the item of "number of statistics", information indicating the number of write data, which is received from the host device 300 by CM 101 and transmitted to the CM 201 from the CM 101 within a predetermined period for collection performed by the writing control unit 230, is registered. The collection period is, for example, 1 minute. The conditions for counting up the statistical number include a case where the write data is transmitted from the CM 101 as a response to the read request from the CM 201, and a case where the write data is transmitted from the CM 101 with the write request. In the item of "optimum securement number", information indicating how many buffer areas having sizes corresponding to each category are required to be secured in the buffer memory unit 211 by the issuance control unit 220 is registered.

The statistical number is reset to "0" each time when the collection period is ended. When the collection period is ended, the optimum number of buffer areas required to be secured in the following collection period is calculated for each category on the basis of the statistical number at that time, and the item of "optimum securement number" of the statistic table 215 is updated according to the calculation result.

FIG. 9 is a diagram illustrating an example of a read request management table. A read request management table 114 is stored in the table memory unit 113. The read request management table 114 includes items of "ID number 2", "category", "size range", and "reception time".

In the item of "ID number", an identifier for identifying a read request is registered. As the identifier, for example, the SCSI command identifier of FIG. 6A is registered. The identifier registered in the item of "ID number" indicates a read request which has been received from the CM 201, but a response thereto has not been made. In the item of "category", information indicating a category is registered. In the item of "size range", information indicating a range of a data size corresponding to the category is registered. In the item of "reception time", the time at which the access control unit 120 has received the read request is registered.

Figure 10:
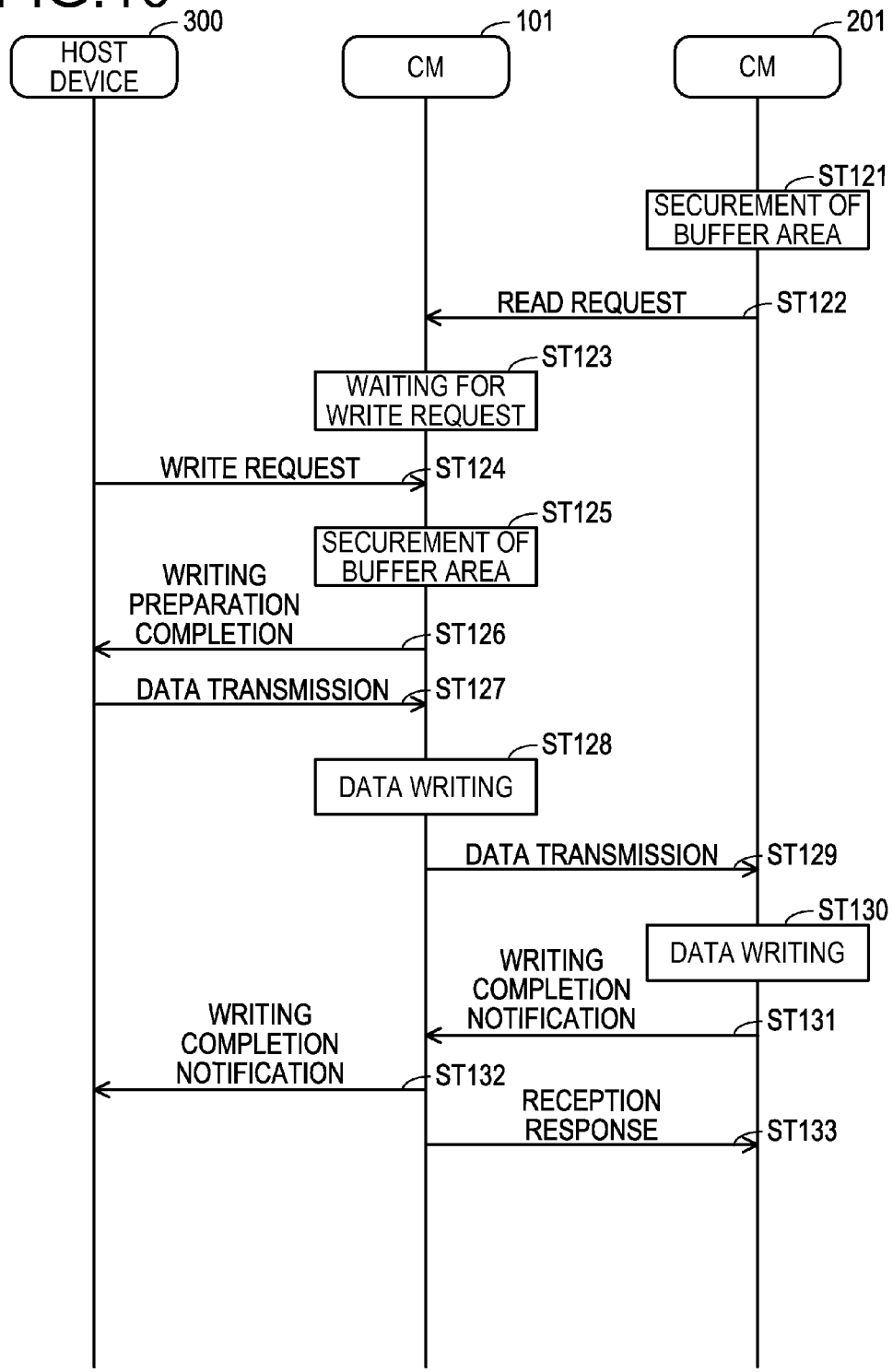
FIG. 10 is a sequence diagram illustrating a backup process according to the second embodiment.

FIG. 10 is a sequence diagram illustrating a backup process according to the second embodiment. Details of the process will be described with reference to FIGS. 11 to 15, and, in FIG. 10, a flow of communications between devices of the CMs 101 and 201 and the host device 300 will be described. Hereinafter, the process illustrated in FIG. 10 will be described.

(ST121) The CM 201 secures a buffer area of a predetermined size in the buffer memory unit 211.

(ST122) The CM 201 transmits a read request, to which the buffer area secured in ST121 is allocated, to the CM 101.

(ST123) The CM 101 waits for a write request transmitted from the host device 300. In FIG. 10, for simple explanation, it is assumed that only one read request is transmitted from the CM 201 prior to ST124.

(ST124) The host device 300 transmits the write request to the CM 101.

(ST125) The CM 101 secures a buffer area for writing write data, in the buffer memory unit 111.

(ST126) The CM 101 notifies the host device 300 that the writing preparation has been completed.

(ST127) The host device 300 transmits the write data to the CM 101.

(ST128) The CM 101 receives the write data, and writes the write data in the buffer area secured in the buffer memory unit 111. The CM 101 also stores the write data written in the buffer area, in the data storage unit 112.

(ST129) The CM 101 transmits the write data written in the buffer area to the CM 201 as a response to the read request.

(ST130) The CM 201 receives the write data, and writes the write data in the buffer area allocated for the read request. The CM 201 stores the write data written in the buffer area, in the data storage unit 212.

(ST131) The CM 201 transmits a writing completion notification to the CM 101.

(ST132) The CM 101 transmits a writing completion notification to the host device 300.

(ST133) The CM 101 transmits a response to the writing completion notification received in ST131, to the CM 201.

According to the process described above in FIG. 10, the CM 101 receives the read request transmitted from the CM 201 in advance before receiving the write request from the host device 300. Then, upon receiving the write request from the host device 300, the CM 101 transmits the write data received from the host device 300, to the CM 201, as a response to the read request which has been received from the CM 201 so that the write data is backed up to the data storage unit 112 of the CM 201. Accordingly, after receiving the write request from the host device 300, the CM 101 may transmit the write data to the CM 201 without performing communications of ST106, and ST108 in FIG. 4. Thus, a time required until the host device 300 is notified of the writing completion may be reduced.

Hereinafter, details of the process in the CM 201 will be described with reference to flowcharts.

Figure 11:
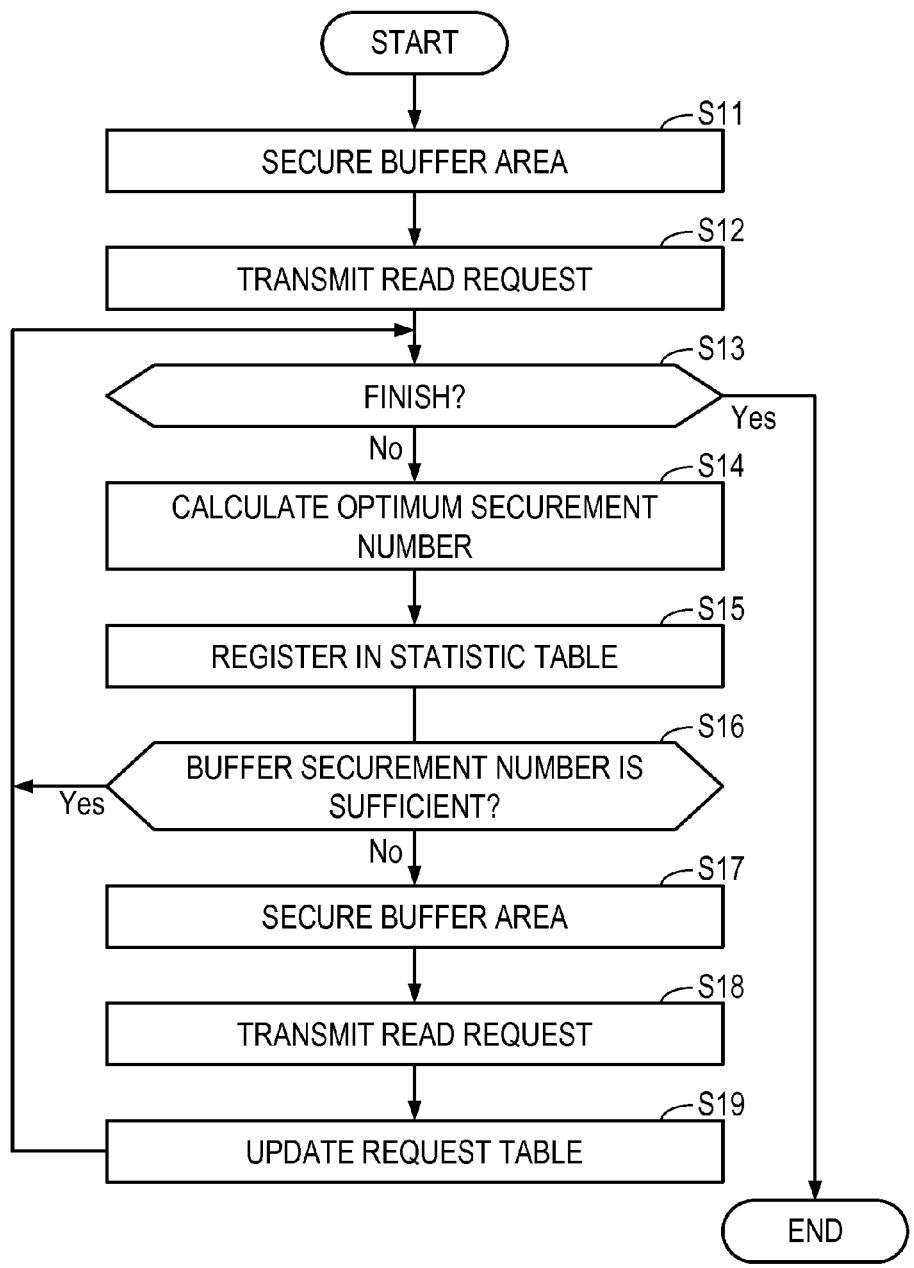
FIG. 11 is a flowchart illustrating an example of a process of transmitting the read request.

FIG. 11 is a flowchart illustrating an example of a process of transmitting a read request. Hereinafter, the process illustrated in FIG. 11 will be described. Processing such as securement of a buffer area and update of the statistic table 215 as described below are assumed to be performed for all the categories of the statistic table 215.

(S11) The issuance control unit 220 registers a predetermined initial value in the item of "optimum securement number" corresponding to each category in the statistic table 215. The issuance control unit 220 secures buffer areas having a size corresponding to each category, in the buffer memory unit 211, according to the registered optimum securement number. For example, when "4" is registered as the optimum securement number corresponding to a category "64 KB" of the statistic table 215, the issuance control unit 220 secures four buffer areas each of which has a size of 64 KB.

The issuance control unit 220 notifies the writing control unit 230 that the securement of the buffer areas is completed, and requests transmission of the read request. The issuance control unit 220 resets values of statistical numbers corresponding to the respective categories in the statistic table 215, to "0".

(S12) The writing control unit 230 transmits the read requests corresponding to the respective buffer areas secured in the buffer memory unit 211 by the issuance control unit 220 in S11, to the CM 101. For example, when the optimum securement number corresponding to the category "64 KB" in the statistic table 215 is "4", the writing control unit 230 transmits four read request packets in each of which, "64 KB" is registered in the item of "required size" of a CDB, to the CM 101. A data size allocated by the issuance control unit 220 is registered in the required size of the read request. For example, in the required size of the read request, "64 KB" is registered.

The writing control unit 230 registers information on the transmitted read requests in the request table 214. Specifically, in the item of "ID number" of the request table 214, an SCSI command identifier is registered. In the item of "category" of the request table 214, a required size of the read request is registered. In the item of "size range" of the request table 214, a range of a data size corresponding to the required size of the read request is registered.

(S13) The writing control unit 230 determines whether to finish the operation of the CM 201. For example, it is determined that the operation is to be finished when an instruction to turn off the CM 201 is received. When it is determined that the operation is to be finished, the process in FIG. 11 is ended. When it is not determined that the operation is to be finished within a predetermined time after execution of S12 or S19, or after determination of "Yes" in S16, the writing control unit 230 instructs the issuance control unit 220 to update the optimum securement numbers of the statistic table 215. Then, the process proceeds to S14. Accordingly, the processing in S14 is executed at predetermined time intervals, that is, each time a predetermined collection period for collecting the statistical numbers is ended. The predetermined time is, for example, 1 minute.

(S14) The issuance control unit 220 performs a calculation of an optimum securement number for each category with reference to the statistical number of the statistic table 215. The optimum securement number is calculated according to a calculation expression of "an overall coefficient x (statistical number of each category/total of statistical numbers of all categories)". The overall coefficient is an integer of 1 or more. The overall coefficient is calculated such that "overall coefficient×1 MB (a maximum category)" is not greater than a maximum capacity securable in the buffer memory unit 211. When the calculation result includes digits after decimal point, the calculation result may be rounded off to the closest integer.

Even when the calculation value of an optimum securement number of a certain category is less than 1, the optimum securement number to be registered in the statistic table 215 in the following S15 may be preferably set as a predetermined number of 1 or more. Accordingly, even if a write request corresponding to the category is not requested from the host device 300 in the immediately preceding collection period, when a write request corresponding to the category is requested from the host device 300 in the following collection period, an optimum read request may be selected.

(S15) The issuance control unit 220 registers the optimum securement number calculated for each category in S14 in the statistic table 215. The issuance control unit 220 resets statistical numbers of all categories in the statistic table 215, to "0." The issuance control unit 220 temporarily stores, in the memory unit 210, information on the before-update optimum securement number of each category in the statistic table 215.

(S16) The issuance control unit 220 compares the before-update optimum securement number of the statistic table 215 with the after-update optimum securement number of the statistic table 215 for each category. When the after-update optimum securement number is not greater than the before-update optimum securement number for all categories, the securement number of buffer areas is sufficient. In this case, the process proceeds to S13. When even for one category, the after-update optimum securement number is greater than the before-update optimum securement number, the process proceeds to S17.

(S17) The issuance control unit 220 secures buffer areas according to the number corresponding to the difference for the category where the after-update optimum securement number is greater, in the buffer memory unit 211. For example, when the after-update optimum securement number is 8 and the before-update optimum securement number is 7 for the category "1 KB", the issuance control unit 220 newly secures one buffer area of 1 KB.

The issuance control unit 220 notifies the writing control unit 230 of information on the newly secured buffer area, and requests transmission of a read request.

(S18) The writing control unit 230 transmits a read request corresponding to each buffer area newly secured by the issuance control unit 220 in S17, to the CM 101. For example, when one buffer area of 1 KB is newly secured, the writing control unit 230 transmits one read request packet in which "1 KB" is registered in the item of "required size" of a CDB, to the CM 101.

(S19) The writing control unit 230 registers information on the read requests transmitted in S18, in the request table 214. Then, the process proceeds to S13.

Figure 12:
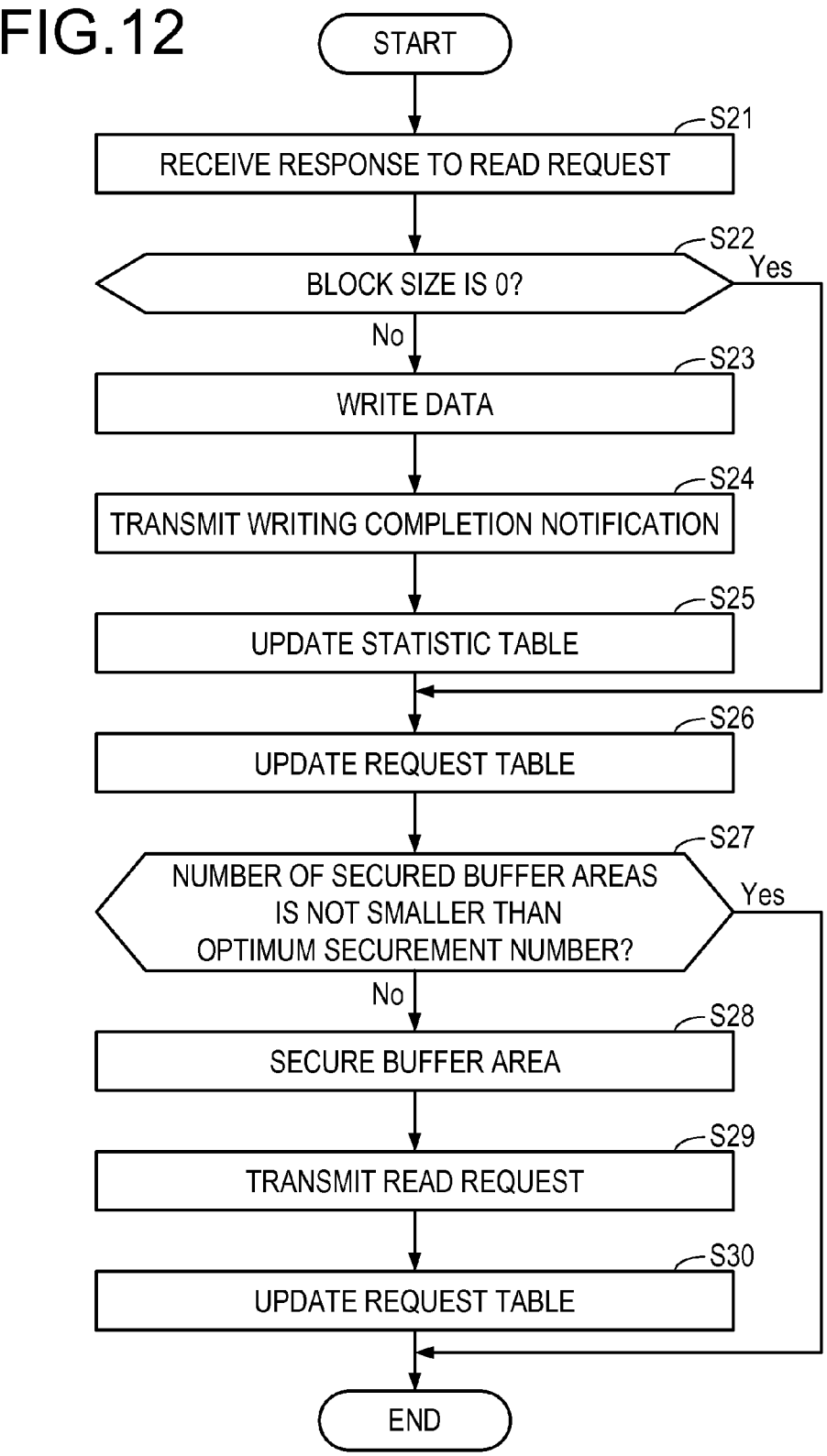
FIG. 12 is a flowchart illustrating an example of a process of receiving a response to the read request.

FIG. 12 is a flowchart illustrating an example of a process of receiving a response to the read request. Hereinafter, the process illustrated in FIG. 12 will be described.

(S21) The writing control unit 230 receives a response to the read request.

(S22) The writing control unit 230 checks the number of blocks in the header information with reference to the data area of the response to the read request. When the number of blocks is zero, the writing control unit 230 releases the memory area in the buffer memory unit 211, which has been allocated for the received read request. Then, the process proceeds to S26. When the number of blocks is not zero, the process proceeds to S23.

(S23) The writing control unit 230 stores the write data stored in the response packet, in the buffer area of the buffer memory unit 211 which has been allocated to the read request. For example, in a case where a buffer area of 4 KB is secured, and a read request with a required size of "4 KB" is made, the writing control unit 230 receives write data of 4 KB or less as a response to the read request. In this case, generally, write data with a size which is greater than 1 KB and not greater than 4 KB are received. The writing control unit 230 stores the received write data in the buffer area of 4 KB.

The writing control unit 230 writes, in the data storage unit 212, the write data written in the buffer area. The writing destination of the write data in the data storage unit 212 is determined based on a LUN and an initiation LBA in the header information.

(S24) The writing control unit 230 transmits a writing completion notification to the CM 101 as a packet illustrated in FIG. 6C. As the transfer ID of the writing completion notification, a transfer ID in the header information added to the write data is registered. Accordingly, the CM 101 which has received the writing completion notification may determine which write data corresponds to the writing completion notification by comparing the transfer ID of the writing completion notification to a transfer ID set in S49 as described below.

The writing control unit 230 receives a notification as a response to the writing completion notification from the CM 101. The following processing in S25 to be executed after the writing completion notification is transmitted may be executed before the response notification is received from the CM 101.

(S25) The writing control unit 230 determines a category of the statistic table 215 on the basis of the data size of the received write data. The writing control unit 230 increments the statistical number corresponding to the determined category by one. For example, in a case of write data of 3 KB, referring to the statistic table 215, 3 KB belongs to a category "4 KB (1 KB<S≤4 KB)". Therefore, the writing control unit 230 determines a category "4 KB". The writing control unit 230 increments a statistical number corresponding to the category "4 KB" by one.

(S26) The writing control unit 230 identifies, on the basis of an SCSI command identifier included in the response to the read request, an ID number indicating the read request corresponding to the received response among ID numbers registered in the request table 214. The writing control unit 230 stores information of a category associated with the identified ID number, in the memory unit 210. The writing control unit 230 deletes a record corresponding to the identified ID number, from the request table 214. Accordingly, the corresponding buffer area is released. The writing control unit 230 instructs the issuance control unit 220 to determine whether to newly secure a buffer area.

(S27) The issuance control unit 220 acquires information on the category stored in the memory unit 210 in S26. The issuance control unit 220 determines an optimum securement number corresponding to the acquired category with reference to the statistic table 215. The issuance control unit 220 detects a registered number in the same category as the acquired category with reference to the categories in the request table 214. The detected registered number indicates the number of buffer areas belonging to the corresponding category among buffer areas which are currently secured. The issuance control unit 220 determines whether the registered number detected in the request table 214 is not less than the optimum securement number of the statistic table 215. When the detected registered number is not less than the optimum securement number, the process is ended. When the detected registered number is less than the optimum securement number, the issuance control unit 220 calculates a difference. Then, the process proceeds to S28.

(S28) The issuance control unit 220 secures buffer areas corresponding to the number of the difference calculated in S27, in the buffer memory unit 211. For example, when the registered number detected for the category "4 KB" is less than the optimum securement number by "2" in S27, the issuance control unit 220 newly secures two buffer areas each of which has a size of 4 KB. The issuance control unit 220 notifies the writing control unit 230 of the information on the newly secured buffer areas, thereby requesting transmission of the read requests.

(S29) The writing control unit 230 transmits, to the CM 101, the read requests corresponding to the respective buffer areas newly secured by the issuance control unit 220 in S28.

(S30) The writing control unit 230 registers information on the read requests transmitted in S29, in the request table 214. Then, the process is ended.

In S26, one of the secured buffer areas is released, and the number of buffer areas which are currently secured is reduced by one. Here, when "Yes" is determined in S27, a new buffer area is not secured. In a case where "Yes" is determined in S27, too many buffer areas have been secured for the corresponding category at the initiation point of the process in FIG. 12. Therefore, a new buffer area is not secured, and the number of the secured buffer areas corresponding to the category is reduced by one as compared to the initiation point of the process in FIG. 12.

Hereinafter, details of the process in the CM 101 will be described with reference to flowcharts.

Figure 13:
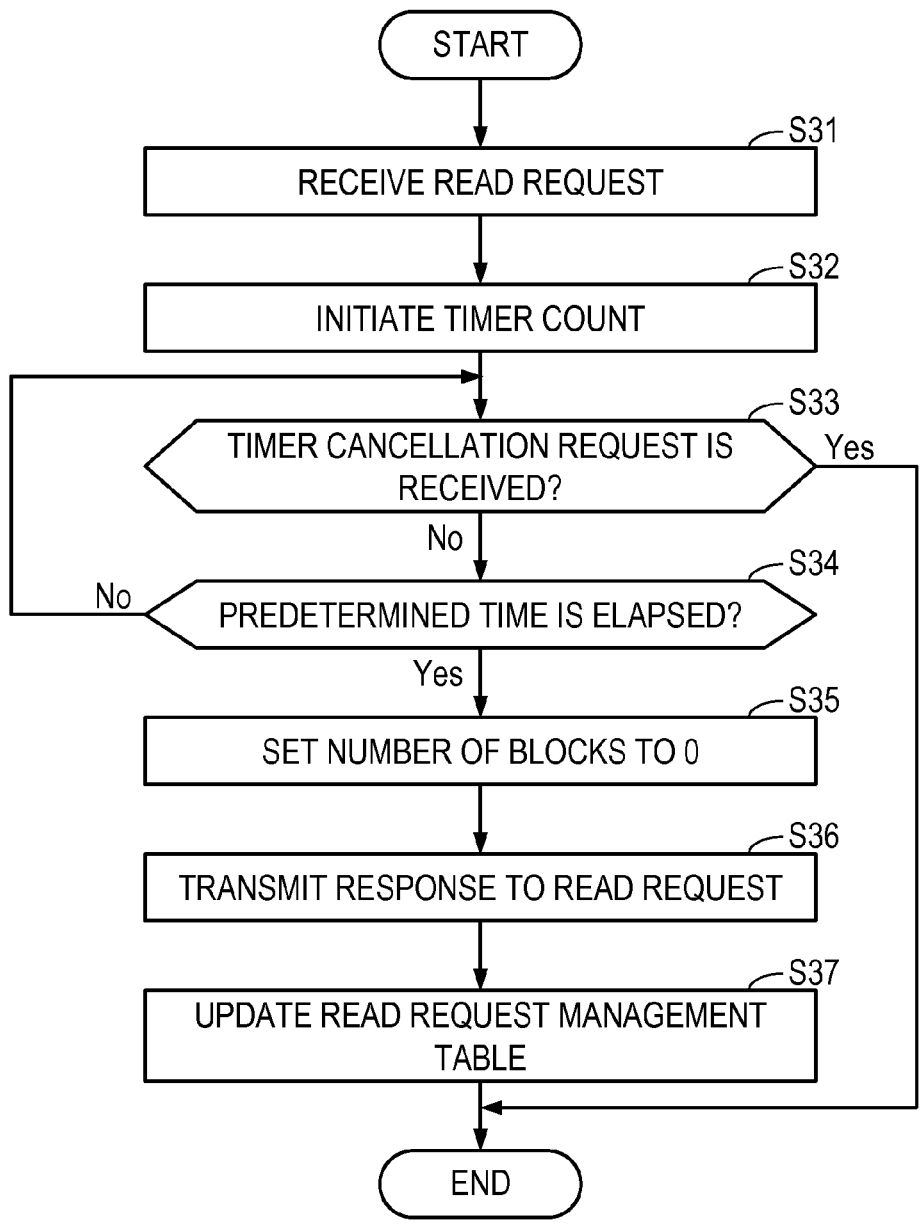
FIG. 13 is a flowchart illustrating an example of a process of receiving the read request.

FIG. 13 is a flowchart illustrating an example of a process of receiving the read request. The process in FIG. 13 is executed each time when the CM 101 receives a read request from the CM 201. Hereinafter, the process illustrated in FIG. 13 will be described.

(S31) The access control unit 120 receives the read request from the CM 201. The access control unit 120 registers information on the read request, in the read request management table 114. In the item of "ID number", the SCSI command identifier in the read request is registered. In the item of "category", a required size of the read request is registered. In the item of "size range", a range of a data size corresponding to the required size in the read request is registered. In the item of "reception time", a time at which the access control unit 120 has received the read request is registered.

The access control unit 120 instructs the monitoring unit 130 to monitor a timer.

(S32) The monitoring unit 130 initiates counting of the timer.

(S33) The monitoring unit 130 determines whether a timer cancellation request corresponding to the received read request has been received from the access control unit 120. The timer cancellation request is received when the write request is received from the host device 300 and the use of a buffer area corresponding to the read request is determined. The timer cancellation request is determined to correspond to the read request received in S31 when the ID number which is the same as the ID number registered in the read request management table 114 in S31 is notified from the access control unit 120. When the timer cancellation request is received, the process is ended. Accordingly, the timer counting corresponding to the read request is ended. When the timer cancellation request is not being received, the process proceeds to S34.

(S34) The monitoring unit 130 determines whether a difference between the reception time of S31 and the count value of the timer becomes a predetermined value or more, that is, whether a time not shorter than a predetermined time has elapsed from the reception time. When the time not shorter than the predetermined time has elapsed, it is determined that time out has occurred, and the process proceeds to S35. When the predetermined time has not elapsed, the process proceeds to S33.

(S35) The monitoring unit 130 generates header information to be included in the response corresponding to the received read request. The monitoring unit 130 sets 0 (zero) to a LUN number, an initiation LBA, the number of blocks, and a transfer ID in the header information.

(S36) The monitoring unit 130 transmits, to the CM 201, a response to the read request, which includes the header information generated in S35. This response is transmitted as the response packet as illustrated in FIG. 6B. In the data item, nothing is stored or padding data is stored.

(S37) The monitoring unit 130 deletes a record including the ID number registered in S31, from the read request management table 114. Then, the process is ended.

According to the process from S32 to S37, a response not including actual data is transmitted from the CM 101 to the CM 201 when a response corresponding to the received read request is not transmitted from the CM 101 for a predetermined time or more. Accordingly, the session for the read request may be normally ended, and the backup process may be continued without causing an error due to time-out for the transmission request in the CM 201.

FIG. 14 is a flowchart illustrating an example of a process of receiving the write request. Hereinafter, the process illustrated in FIG. 14 will be described.

(S41) The access control unit 120 receives a write request from the host device 300. The write request includes information indicating a data size of write data corresponding to the write request.

(S42) The access control unit 120 refers to size ranges in the read request management table 114 to determine whether there is a read request (ID number) corresponding to a size range including the data size indicated by the write request. Referring to the size ranges in the read request management table 114, for example, when the data size indicated by the write request is 0.7 KB, 0.7 KB falls within the size range "S≤1 KB". Therefore, the access control unit 120 identifies an ID number which satisfies the size range "S≤1 KB".

When there is a read request corresponding to the data size indicated by the write request, the access control unit 120 identifies the ID number. Then, the process proceeds to S44. When there is no read request corresponding to the data size indicated by the write request, the process proceeds to S43.

(S43) The access control unit 120 receives write data from the host device 300 in the same sequence as in ST102 to ST105 of FIG. 4, and stores the write data in the data storage unit 112. The access control unit 120 also performs transmission of data to the CM 201 by a write request in the same sequence as in ST106 to S112 of FIG. 4. Then, the process is ended.

(S44) The access control unit 120 notifies the monitoring unit 130 of the timer cancellation request together with the ID number identified in S42.

(S45) The access control unit 120 deletes a record including the ID number identified in S42, from the read request management table 114.

(S46) The access control unit 120 secures the buffer area for storing write data in the buffer memory unit 111.

(S47) The access control unit 120 notifies the host device 300 that the writing preparation has been completed.

(S48) The access control unit 120 receives the write data from the host device 300. The access control unit 120 writes the write data in the buffer area secured in the buffer memory unit 111. Then, the access control unit 120 writes, in the data storage unit 112, the write data written in the buffer area. The writing destination in the data storage unit 112 is determined based on a LUN, an initiation LBA, the number of blocks included in the write request received in S41.

(S49) The access control unit 120 generates header information to be included in the response to the read request. The access control unit 120 sets the LUN, the initiation LBA, and the number of blocks included in the write request received in S41, as a LUN number, an initiation LBA, and the number of blocks in the header information. The access control unit 120 also generates a transfer ID indicating the write request received in S41, and sets the generated transfer ID as a transfer ID in the header information. The transfer ID may be, for example, a packet identifier of a write request packet received in S41.

The access control unit 120 transmits the write data added with the header information to the CM 201, as the response packet as illustrated in FIG. 6B. Then, the process proceeds to S51.

FIG. 15 is a flowchart illustrating an example of a process of receiving the write request. Hereinafter, the process illustrated in FIG. 15 will be described.

(S51) The access control unit 120 initiates counting of a timer.

(S52) The access control unit 120 monitors a writing completion notification in which the transfer ID in the header information set in S49 is set in a CDB, among writing completion notifications from the CM 201. The access control unit 120 determines whether the corresponding writing completion notification has been received from the CM 201 within a predetermined time. When the notification has been received within the predetermined time, the process proceeds to S54. When the notification has not been received within the predetermined time, the process proceeds to S53.

(S53) The access control unit 120 transmits an error notification indicating that the process corresponding to the write request in S41 has not been normally completed, to the host device 300. Then, the process is ended.

(S54) The access control unit 120 transmits a writing completion notification indicating that the process corresponding to the write request in S41 has been normally completed, to the host device 300.

(S55) The access control unit 120 transmits, to the CM 201, a response to the corresponding writing completion notification received from the CM 201 in S52. Then, the process is ended.

In the process of FIGS. 14 and 15, since the header information is added to the write data in S49, the writing control unit 230 of the CM 201 may recognize a writing destination of the write data with reference to the header information even though the read request is transmitted in advance.

The response transmitted in S49 and the writing completion notification received in S52 are transmitted and received through separate communication sessions. Therefore, the access control unit 120 is incapable of determining which write data corresponds to the writing completion notification transmitted from the CM 201. However, since the transfer ID is added to the header information in S49, and the transfer ID is set in a writing completion notification, the access control unit 120 may determine which write data corresponds to the writing completion notification received from the CM 201. Accordingly, the access control unit 120 may securely transmit an appropriate writing completion notification corresponding to a write request, to the host device 300 in S55.

According to the second embodiment, a plurality of buffer areas are secured in the CM 201, and read requests corresponding to the buffer areas are transmitted to the CM 101 in advance. Accordingly, even if write requests are continuously received from the host device 300, the CM 101 is likely to transmit write data to the CM 201, as a response to one read request selected from the received read requests without waiting for transmission of a new read request from the CM 201. Thus, the response performance to the host device 300 may be improved.

According to the second embodiment, the CM 201 secures buffer areas with different sizes in the CM 201, and transmits read requests corresponding to the buffer areas to the CM 101 in advance. The CM 101 selects a read request to which a buffer area close to a size of the write data is allocated, among the received read requests, and transmits the write data as a response to the selected read request. Accordingly, in the CM 201, an extra buffer area is hardly secured. For example, when write data of 8 KB are written in a buffer area of 64 KB, a buffer area of 56 KB is extra. When not only the buffer area of 64 KB but also the buffer area of 8 KB is secured, the write data of 8 KB may be written in the buffer area of 8 KB.

The CM 201 may optimize the number of buffer areas to be secured or the size of each of the buffer areas by the processes illustrated in FIGS. 11 and 12, based on the history of write requests from the host device 300 in the immediately preceding collection period. Here, an example of optimizing the securement of the buffer areas will be described using FIGS. 16A and 16B.

FIGS. 16A and 16B are diagrams illustrating a specific example of a process of optimizing buffer area securement. A statistic table 215a of FIG. 16A is an example of a statistic table 215 at a point of time a predetermined collection period has been ended. For example, in the statistic table 215a, the item of "statistical number" corresponding to a category "4 KB" indicates that the writing control unit 230 has received forty pieces of write data corresponding to the category "4 KB" for 1 min.

The issuance control unit 220 is instructed to update the optimum securement numbers in the statistic table 215 by the writing control unit 230, and performs update of the optimum securement numbers. The optimum securement number for each category is calculated according to a calculation expression of "an overall coefficient×(a statistical number of each category/total of statistical numbers in all categories)". For example, in FIG. 16A, update of an optimum securement number corresponding to a category "4 KB" may be considered. The overall coefficient is assumed to be 48. According to the calculation expression above, 48×(40/420)≈4.57. 4.57 may be rounded off to 5 when it is rounded to unit. The issuance control unit 220 updates an optimum securement number corresponding to the category "4 KB" to 5. The issuance control unit 220 performs a similar update process of updating an allocation number for each of all categories.

When the calculation result is 0 (zero), the optimum securement number is preferably set as 1. For example, in FIG. 16A, update of an optimum securement number corresponding to a category "256 KB" may be considered. When the overall coefficient is 48, 48×(0/420)=0 according to the calculation expression above. The issuance control unit 220 updates an optimum securement number corresponding to the category "256 KB" to 1.

When updates of allocation numbers of respective categories are ended, the issuance control unit 220 sets statistical numbers of respective categories in the statistic table 215 to 0 (zero). A statistic table 215b of FIG. 16B illustrates a state after the updates of optimum securement numbers for all categories have been performed.

Referring to the statistic table 215a, the number of received write data corresponding to a category 1 MB is small. When the number of received write data is small, the number of write data to be received may be assumed to be small likewise even after 1 minute. When the securement number of a buffer area of 1 MB is not adjusted, an extra buffer area of 1 MB for write data not to be received may remain secured. On the other hand, the number of received write data corresponding to a category 16 KB is large. Thus, the number of write data to be received may be assumed to be large likewise even after 1 minute. When the securement number of a buffer area of 16 KB is not adjusted, and the number of received write data is larger than the securement number, some pieces of write data are inevitably written in the CM 201 by the write request from the CM 101, thereby lowering the host response performance.

Since the optimum securement number is adjusted as described above, it is possible to secure appropriate numbers and sizes of buffer areas according to the statistical number of each category which changes with time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A storage control device, comprising:
   a memory; and
   a processor coupled to the memory, the processor configured to:
   receive a read request from a backup device including a secondary memory unit before receiving a write request of first data from a host device;
   upon receiving the write request from the host device after the read request is received from the backup device, store the first data to the memory and transmit the first data to the backup device as a response to the read request from the backup device; and
   upon receiving a writing completion notification from the backup device notifying a completion of writing the first data to the secondary memory unit, transmit a writing completion response to the host device notifying a completion of writing the first data to the memory as a response to the write request from the host device.

2. The storage control device according to claim 1, wherein
   the processor is configured to
   add identification information to the first data when transmitting the first data to the backup device, the identification information identifying the first data, and
   transmit the writing completion response to the host device upon receiving the writing completion notification including the identification information from the backup device.

3. The storage control device according to claim 1, wherein
   the processor is configured to
   receive a plurality of read requests from the backup device, the plurality of read requests being allocated with respective buffer areas secured in the backup device,
   select, upon receiving the write request from the host device, a first read request allocated with a first buffer area having a size that is equal to or larger than a first size of the first data and is closest to the first size among the buffer areas, the first read request being one of the plurality of read requests, and transmit the first data to the backup device as a response to the first read request.

4. A storage system, comprising:
a first storage control device including a first processor and a first memory unit; and
a second storage control device including a second processor and a second memory unit,
wherein the first processor is configured to:
  receive a read request from the second storage control device before receiving a write request of first data from a host device;
  upon receiving the write request from the host device after the read request is received from the second storage control device, store the first data to the first memory unit and transmit the first data to the second storage control device as a response to the read request from the second storage control device; and
  upon receiving a writing completion notification from the second storage control device notifying a completion of writing the first data to the second memory unit, transmit a writing completion response to the host device notifying a completion of writing the first data to the first memory unit as a response to the write request.

5. The storage control device according to claim 1, wherein the read request from the backup device does not specify particular data in the memory.

6. The storage control device according to claim 1, wherein the write request from the host device along with the first data is received via a relay device, and the processor is further configured to
  transmit a read request to the relay device;
  receive the first data from the relay device as a response to the read request transmitted to the relay device, the first data being received by the relay device from the host device after the read request is transmitted from the processor to the relay device; and
  write the first data to the memory.

* * * * *